Dec. 17, 1957  C. B. DE VLIEG ET AL  2,816,770
TOOL HOLDER AND ADAPTER
Filed Sept. 7, 1955  3 Sheets-Sheet 2

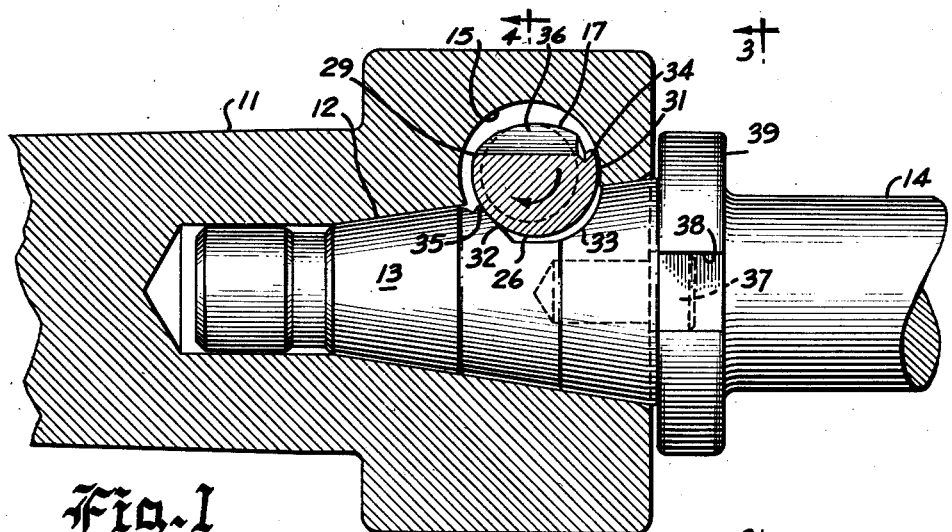
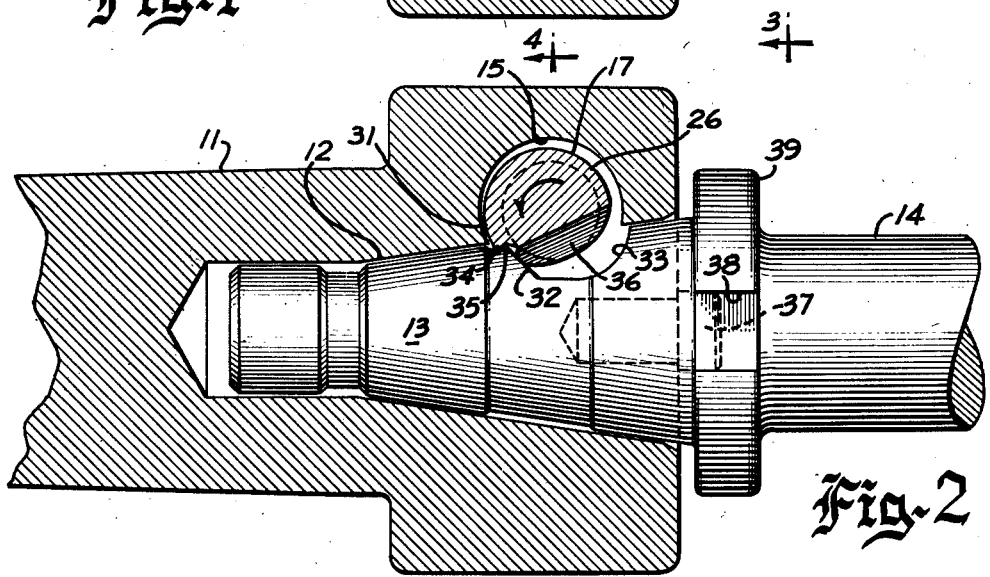
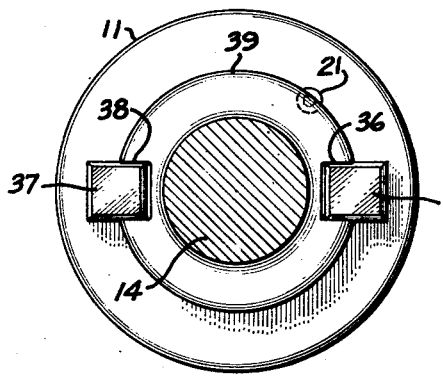

Inventors
Charles B. DeVlieg and
Allen N. Sweeny
by McCanna & Morsbach
Attorneys.

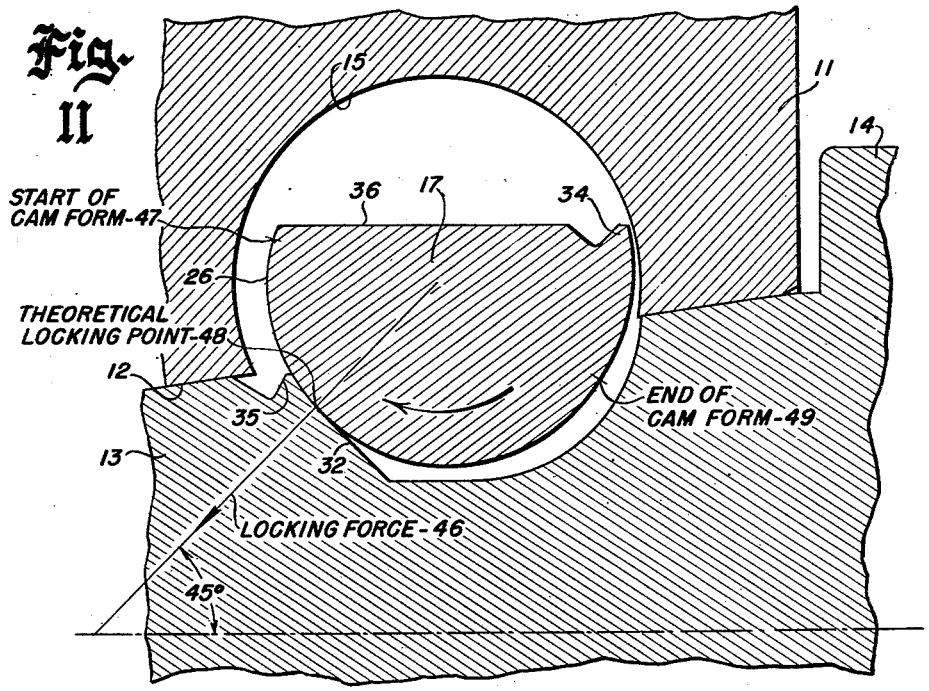
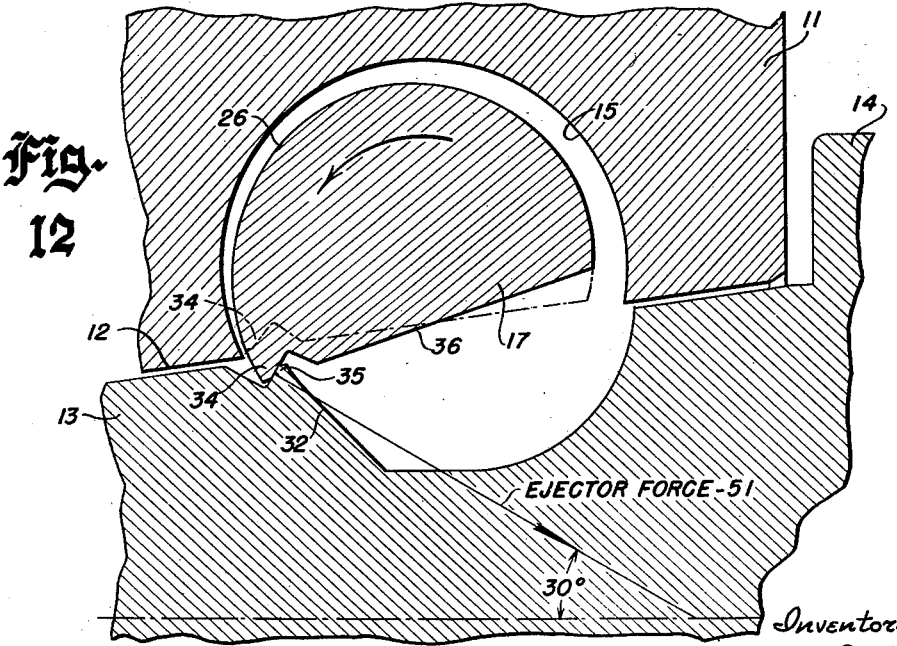

United States Patent Office 2,816,770
Patented Dec. 17, 1957

2,816,770

TOOL HOLDER AND ADAPTER

Charles B. De Vlieg, Ferndale, and Allen N. Sweeny, Grosse Pointe Farms, Mich., assignors to De Vlieg Corporation, Detroit, Mich., a corporation of Michigan Application September 7, 1955, Serial No. 532,815

5 Claims. (Cl. 279—97)

This invention relates to tool holders of the kind used for attaching a cutting tool or tool adapter to a driving spindle or other driving member, particularly for metal cutting tools in the machine tool industry.

Heretofore it has been common practice to provide means for locking a taper tool holder in the paper socket of a driving spindle or the like as by means of cam actions or screw connections. The tool holder must necessarily be firmly locked in the spindle to insure proper drive of the tool; and although a so-called non-sticking taper angle is used, the tool holder invariably is so firmly forced into the taper socket as to require hammering on the holder or the use of a drift pin to loosen the holder. This hammering is apt to damage or impair the accuracy of the machine spindle with which the tool holder is being used. Also, such prior locking means have not been altogether satisfactory because they have been so dependent on the human element and the degree of skill, or sometimes carelessness, on the part of the operator, in locking and releasing the toolholder.

The main object of the present invention is, therefore, to provide a new and improved means for locking a tool holder in a spindle and quick-releasing the tool holder when it is to be removed, in such manner that the tool holder will be most firmly and accurately locked and yet it may be quickly removed with little effort on the part of the operator and without danger of damaging the machine or the coacting parts. Our invention is also intended as a time saver in machine shops where on some jobs the tool holders must be changed a number of times, and this may be done quickly and easily regardless of the skill of the operator and without danger of damaging or impairing the machine parts.

Another object of our invention is to provide a novel tool holder locking and ejecting means characterized by a combined cam-lock and ejector which coacts between the tool holder and the spindle or driving member to lock the tool holder by a cam section when turned in one direction and to release and eject the tool holder when turned in the opposite direction.

Another object of our invention is to combine in cooperative relation with a locking means such as a cam lock, a driving connection between the spindle or driving member and the tool holder whereby the torque drive is transmitted with extreme accuracy of alignment of the cam faces of said cam lock and on a larger radius or leverage, whereby to obtain a more solid and effective drive. Here, again, our invention insures the desired accuracy regardless of skill or care on the part of the operator when setting the tool holder in position.

Another object of our invention is to provide an improved structure which may be manufactured at a compartively low cost and which will serve in a practical manner the objects described.

Other objects and attendant advantages will be understood from the following description when considered in connection with the accompanying drawings, in which:

Figure 1 is a longitudinal section through a drive spindle, showing in elevation a tool holder locked in the taper socket of the spindle by the locking means of our invention;

Fig. 2 is a similar view with the locking means turned to the position for releasing the tool holder and for ejecting it;

Figure 4:
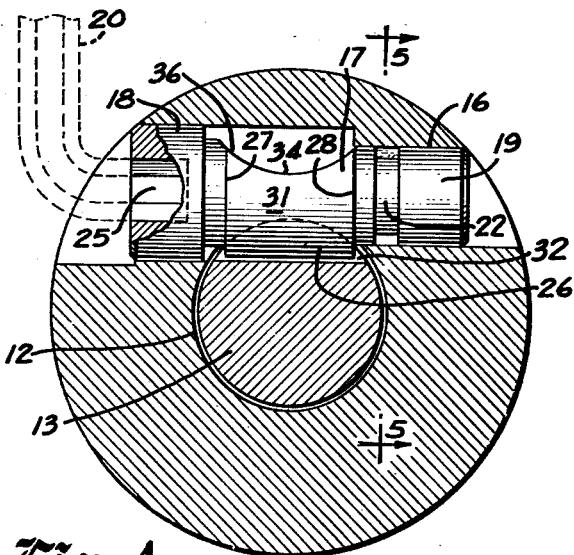
Figure 5:
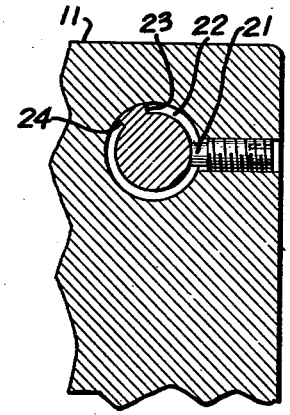
Figure 6:
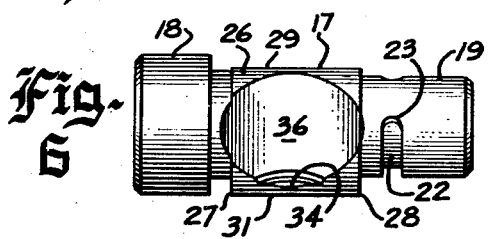
Figure 8:
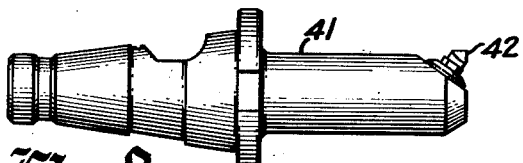
Figure 9:
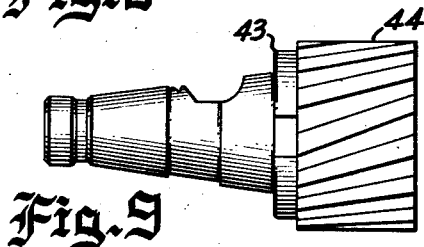
Figure 7:
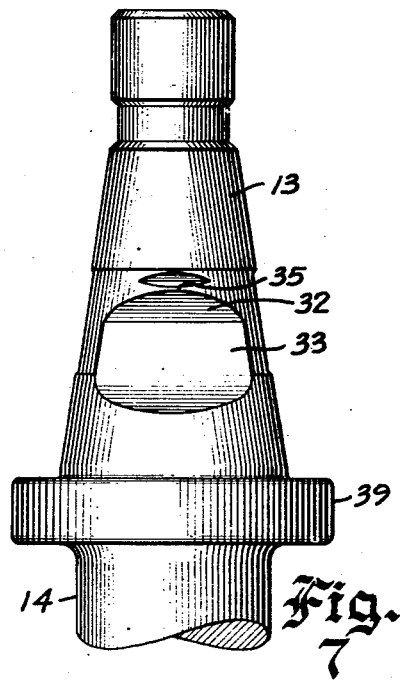
Figure 10:
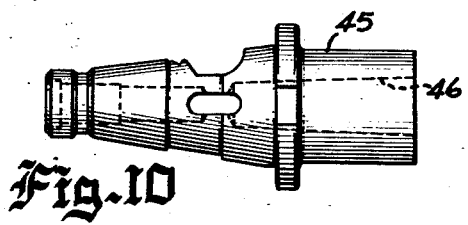

Figs. 3 and 4 are cross-sections taken on the section lines 3—3 and 4—4, respectively, of Fig. 1;

Fig. 5 is a detail section taken on the section line 5—5 of Fig. 4;

Fig. 6 is a top view of the combined cam lock and ejector;

Fig. 7 is a top view of the tool holder removed from the spindle;

Figs. 8, 9 and 10 are side views of our improved tool holder showing its application to different tool jobs;

Figs. 11 and 12 are sectional views, enlargements of Figs. 1 and 2, respectively, illustrating the lines of force in locking and ejecting the tool holder.

The tool spindle or driving member designated generally by 11, is provided with a taper socket 12 adapted to receive the taper end 13 of a tool holder designated generally by 14. The member 11 may be the drive spindle or any means for attachment to a driving spindle. In machine tool practice the member 11 is the driving member. The taper angle of the socket 12 and the tool holder end 13 is preferably what is known as the NMTB taper, a standard adopted by the National Machine Tool Builders. This taper is designed to be non-sticking but in view of the extreme firmness and rigidity desired in the engagement between these tapered parts and the fact that some workmen unduly force the tool holder into the taper socket, it is sometimes difficult to remove the tool holder without hammering or drifting, as is well known in this art. The invention, however, is not limited to this particular taper angle.

As shown in Fig. 4, the drive member 11 is provided with a cross-bore 15 which intersects the taper bore 12 and has a reduced diameter bore 16 at one end. In this bore is mounted for rotative movement a combined locking and ejecting member designated generally by 17. This member 17 has trunnion portions 18 and 19 having bearing support in the larger and smaller portions of the cross-bore as clearly shown in Fig. 4. A pin 21 threaded in the spindle member engages in groove 22 to retain the member 17 against endwise displacement. As shown in Fig. 5, the groove 22 has ends 23 and 24 which limit the rotative movement of the member 17 by engagement with the pin 21. The member 17 has a socket 25 in one end for receiving a standard wrench 20 which the operator uses to turn the member 17 in one direction for locking, and to turn in the opposite direction for releasing and ejecting the tool holder. These functions are performed by the novel means which will now be described.

The member 17 is machined to provide a cam 26 having a broad face terminating at the ends 27 and 28 and having a gradually increasing radii extending from a low point 29 to a high point 31, as shown in Figs. 1 and 2. This cam surface is adapted to contact the flat, inclined face 32 which is machined at one end of a recess 33 in the taper end 13 of the tool holder. The shape of the face of cam 26 is best shown in Fig. 1 in relation to the trunnion 19 (shown in dotted lines) upon which the member 17 is mounted for rotative movement. By turning the member 17 in a clockwise direction, viewing Fig. 1, the cam 26 engages the face 32 and imparts gradually increasing pressure against the fact 32 and thereby forces the taper end 13 into the taper socket 12 to seat and lock the tool holder therein. This establishes not only locking engagement but also driving engagement between the members 11 and 14. By turning the member 17 in a counterclockwise direction the cam 26 will gradually withdraw from the face 32 to permit withdrawal of the tool holder member 14. However, invariably the taper end 13 is engaged so tightly in the socket 12 as to make it difficult to withdraw without the use of a hammer or a drift pin, as was commonly used prior to our invention.

Our invention provides novel means for releasing and ejecting the tool holder from its said locked engagement, consisting of a wide ejector finger 34 formed on the member 17 at the high end of the cam portion and in cooperative relation to a complemental finger 35 formed on the taper end of the tool holder adjacent to the high end of the inclined cam face 32. It will be observed that the member 17 is cut away at 36 to provide clearance between the members 17 and 13 at certain positions of the member 17. To unlock or release the cam member from the locking position shown in Fig. 1, the wrench 20 will be inserted into the socket 25 and operated to move in a counter-clockwise direction, thereby withdrawing the cam face 26 from the cam face 32. This movement of the wrench will be continued in a quick stroke to move the ejector finger 34 into interlocking engagement with the finger 35 to impart a striking impact force in a direction to release the taper end 13 from the socket 12 and eject the tool holder, as illustrated in Fig. 2. This movement of the member 17 is about 180°. The parts are so designed that by this quick manual movement of the wrench 20 the finger 34 will impart an impact force in a direction lengthwise of the tool 13 which will unseat the tapered end 13 from the socket 12. However, as shown in Fig. 2, although the tool holder 14 has been unlocked from the spindle 11 and partly ejected, it is not free to be withdrawn therefrom because of interference between the fingers 34 and 35. The reaction from the impact blow will rebound the member 17 slightly in a clockwise direction, thereby withdrawing the finger 34 from the area within the socket 12. Should the operator retard this reaction he will reverse the movement of the wrench the slight distance necessary in a clockwise direction to withdraw the finger 34 and bring the clearance space 36 into substantially parallel relation with the taper of the tool holder. This gives full clearance for withdrawing the holder 14 from the socket 12. These operations of locking and ejecting the tool holder are further illustrated in Figs. 11 and 12. In Fig. 11 which is an enlargement of the parts shown in Fig. 1, the member 17 has been moved to the fully locked position. In this position the member 17 exerts a locking force in the line designated by 46. This is effected by the described cam action, the result of the gradually rising cam face from the point 47 to a theoretical locking point 48. However, this cam face continues to rise gradually to approximately the point 49. This additional cam face from the locking point 48 to the point 49 is for the purpose of insuring full locking force in the event of wear of the parts or in case of variations in manufacture of the cooperating parts necessitating clamping action beyond the theoretical full locking at 48. The cam face may be continued to the finger 34. In Fig. 12 which is an enlargement of the parts shown in Fig. 2, the member 17 has been moved in a counterclockwise direction to withdraw the cam from the face 32 and bring the finger 34 into impact engagement with the finger 35 in a manner to impart an ejector force in the line designated by 51. This unlocking and ejecting of the tool holder is immediately evident to the operator and he then gives a slight reverse movement to the wrench 20, thereby withdrawing the finger to the dotted line position shown in Fig. 12, the clearance position described. Thus, by means of a single member 17 a tool holder is locked in a drive member and it is subsequently released and ejected therefrom, simply by turning movement of this member 17. By this means an operator may quickly lock a tool holder in a spindle or the like and he may just as quickly release and eject the tool holder; and these functions may be very accurately performed without depending upon special skill or care of the operator.

A further feature of our invention is the provision of a driving connection between the numbers 11 and 14 producing improved results. This consists of one or more driving lugs 37 suitably fixed and rigid on the end face of the spindle member 11 and arranged to fit into slots or recesses 38 in a flange 39 integral with the tool holder 14. The coacting faces of the lugs 37 and slots 38 are preferably parallel with the longitudinal axis of the member 11 when they are locked together. With this construction the coacting faces 37—38 will serve to accurately align the tool holder 14 with the spindle so that the cam face 32 will be brought into precise and accurate relation to the eccentric cam face 26, thus eliminating any improper cam contact or disalignment in the engagement of the coacting cam surfaces between the ends 27 and 28 of the face 26. Another advantage is that a large diameter drive is provided by means of the driving lugs 37 which will give greater driving torque than the engagement between the cam faces 26—32. This drive through the lugs 37 insures an exceptionally solid and rigid driving connection and relieves wear and strain on the cam faces 26—32 and also avoids possible loosening of these faces in the event of slight disalignment between the members 11 and 14 which might occur in the absence of the drive 36—37.

Our invention is intended for application to tool holders generally where a taper member fits into a taper socket. As described above, the taper socket may be in a drive spindle or some other drive member. We wish to point out that the tool holder member having the taper end portion for fitting into the taper socket may be the tool itself, or it may be what is known as a tool adapter, or it may be any of a variety of different forms.

In the embodiment shown in Figs. 1, 2, 3 and 4, the member 14 is a tool holder. In Fig. 8 we have shown what is known as a "boring bar assembly" in which the tool holder 41 is provided with a boring tool 42. In Fig. 9 we have shown what is known as an "adapter" 43 for an end milling cutter 44. Cutters of other sizes or shapes may be substituted on the adapter 43. In Fig. 10 we have shown an adapter 45 provided with a taper socket 46 for receiving the taper shank of a tool such as a drill or a milling cutter. Also the tool holder proper may serve to hold a tool chuck. This illustrates some of a variety of tool holders or adapters to which our invention applies. It will be apparent therefore, that our invention is particularly advantageous where the job requirements call for changing tools as in a series of cutting operations; there is a great saving of time and effort on the part of the operator; a most effective driving connection is established; and the parts may be almost instantly disconnected easily and without damage to the machine.

It is believed that the foregoing conveys to those skilled in this art a clear understanding of our invention. However, it should be understood that in the practice of our invention, changes may be made in the construction and arrangement of parts without departing from the spirit and scope of our invention as expressed in the appended claims.

We claim:

1. In combination, a driving member having a taper socket, a tool holder member having a taper end adapted to seat in said socket, and means operable between said members to lock the taper end in the socket by a cam action in one direction and to eject the taper end by applying a force in the opposite direction, said means including a rotating member having a cam which functions to effect said locking upon rotative movement of said member in one direction and having an ejector finger which functions to unseat said taper end upon rotative movement of said member in the opposite direction.

2. A tool holder comprising, in combination, a driving member having a taper socket and a rotative member intersecting said socket, and a tool holder member having a taper end adapted to seat in said taper socket and having a cam face angular with respect to the longitudinal axis of said member and also having an ejector finger adjacent to the outer end of said cam face, said rotatable member having a cam cooperable with said cam face upon rotative movement of said member in one direction to lock the taper end of tool holder in the taper socket and having an ejector finger cooperable with the first mentioned ejector finger upon rotative movement of said member in the opposite direction to release and eject the tool holder from the driving member.

3. In combination, a driving member having a taper socket, a tool holder having a taper end adapted to seat in said taper socket, a cam face and an ejector finger adjacent thereto on said taper end, and a member rotatable on the driving member having a cam for engaging said cam face to lock said taper end in the taper socket upon rotative movement in one direction and having an ejector finger for engaging the first mentioned ejector finger upon rotative movement in the opposite direction to impart ejecting movement to the tool holder.

4. A tool holder having driving and driven members, one having a taper socket and the other a taper portion adapted to seat in said socket, and means coacting between said members including a rotative member having a cam action serving to lock the taper portion in said seat in the taper socket upon rotative movement in one direction and having an ejector action serving to loosen the taper portion from said seat and eject the taper portion upon rotative movement in the opposite direction.

5. In combination between a member having a taper socket open at its wide end and a member having a taper corresponding with that of said socket and adapted to be seated in said socket, of means coacting between said members including a single rotative member mounted in the socket member having a peripheral cam face gradually rising to a theoretical locking point and also having a peripheral ejector finger beyond said locking point, and faces on said taper member in cooperative relation with said cam face and said ejector finger arranged so that upon rotative movement of said rotative member in one direction its cam face will engage the coacting face on the taper member and force the latter into said seat and upon rotative movement in the opposite direction it will withdraw its cam face from said engagement and upon further quick rotative movement its ejector finger will engage said coacting face in an impact force which will loosen the taper member from its seat in an ejecting action.

References Cited in the file of this patent

UNITED STATES PATENTS

| | | |
|---|---|---|
| 1,861,504 | Maxfield | June 7, 1932 |
| 2,433,127 | Kinzbach | Dec. 23, 1947 |

UNITED STATES PATENT OFFICE

CERTIFICATE OF CORRECTION

Patent No. 2,816,770                                December 17, 1957

Charles B. De Vlieg et al.

It is hereby certified that error appears in the above numbered patent requiring correction and that the said Letters Patent should read as corrected below.

In the grant, lines 2 and 3, for "assignors to De Vlieg Corporation," read -- assignors, by mesne assignments, to De Vlieg Machine Company, --; line 13, for "De Vlieg Corporation," read -- De Vlieg Machine Company, --; in the heading to the printed specification, lines 4 and 5, for "assignors to De Vlieg Corporation," read -- assignors, by mesne assignments, to De Vlieg Machine Company, --.

Signed and sealed this 11th day of February 1958.

(SEAL)
Attest:

KARL H. AXLINE                                            ROBERT C. WATSON
Attesting Officer                                       Commissioner of Patents